(12) United States Patent
Zhang et al.

(10) Patent No.: US 11,979,606 B2
(45) Date of Patent: May 7, 2024

(54) CONDITIONAL RECOLOR FOR VIDEO BASED POINT CLOUD CODING

(71) Applicant: TENCENT AMERICA LLC, Palo Alto, CA (US)

(72) Inventors: Xiang Zhang, Sunnyvale, CA (US); Wen Gao, West Windsor, NJ (US); Shan Liu, San Jose, CA (US); Weiwei Feng, Mountain View, CA (US); Bing Jian, Cupertino, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 37 days.

(21) Appl. No.: 17/495,301

(22) Filed: Oct. 6, 2021

(65) Prior Publication Data
US 2022/0394293 A1    Dec. 8, 2022

Related U.S. Application Data

(60) Provisional application No. 63/197,196, filed on Jun. 4, 2021.

(51) Int. Cl.
*H04N 19/597* (2014.01)
*G06T 15/04* (2011.01)
*H04N 19/184* (2014.01)

(52) U.S. Cl.
CPC .......... *H04N 19/597* (2014.11); *G06T 15/04* (2013.01); *H04N 19/184* (2014.11); *G06T 2210/56* (2013.01)

(58) Field of Classification Search
CPC .... H04N 19/597; H04N 19/184; G06T 15/04; G06T 2210/56
(Continued)

(56) References Cited

U.S. PATENT DOCUMENTS

2019/0313110 A1* 10/2019 Mammou ............... H04N 19/88
2021/0099701 A1   4/2021 Tourapis et al.
2021/0227232 A1*  7/2021 Oh ................... H04N 21/85406

FOREIGN PATENT DOCUMENTS

WO      2019/158821 A1     8/2019
WO   WO-2019158821 A1 *   8/2019
WO      2020/232281 A1    11/2020

OTHER PUBLICATIONS

Christian Tulvan et al., "Use Cases for Point Cloud Compression (PCC)", International Organisation for Standardisation Organisation Internationale de Normalisation ISO/IEC JTC1/SC29/WG11 Coding of Moving Pictures and Audio, ISO/IEC JTC1/SC29/WG11 MPEG2015/ N16331, 2016 (8 pages total).
(Continued)

*Primary Examiner* — Ayman A Abaza
(74) *Attorney, Agent, or Firm* — Sughrue Mion, PLLC

(57) ABSTRACT

Methods and apparatuses of encoding a video stream using video point cloud coding include obtaining a source point cloud; generating a geometry map and a texture map based on the source point cloud; generating a reconstructed geometry map and a reconstructed texture map using lossy coding without using recoloring, wherein a resolution of the reconstructed geometry map is same as a resolution of the reconstructed texture map; obtaining a point of the source point cloud corresponding to a geometry pixel of the geometry map and a texture pixel of the texture map; selecting a color of the texture pixel based on a color of the obtained point; and generating an encoded video stream based on the selected color, the geometry map, and the texture map.

17 Claims, 13 Drawing Sheets

(58) Field of Classification Search
USPC .................................................. 375/240.02
See application file for complete search history.

(56) References Cited

OTHER PUBLICATIONS

Rufael Mekuria et al., "Requirements for Point Cloud Compression", International Organisation for Standardisation Organisation Internationale de Normalisation ISO/IEC JTC1/SC29/WG11 Coding of Moving Pictures and Audio, ISO/IEC JTC1/SC29/WG11 MPEG2016/n16330, 2016 (3 pages total).
"V-PCC Codec Description", ISO/IEC JTC 1/SC 29/WG 7, WG 7, MPEG 3D Graphics Coding, 2020 (73 pages total).
International Search Report dated Jan. 25, 2022 from the International Searching Authority in International Application No. PCT/US2021/054559.
Written Opinion dated Jan. 25, 2022 from the International Searching Authority in International Application No. PCT/US2021/054559.
Extended European Search Report dated Jun. 21, 2023 in European Application No. 21938134.0.
Japanese Office Action issued Jan. 9, 2024 in Application No. 2022-567066.

* cited by examiner

FIG. 8

CONDITIONAL RECOLOR FOR VIDEO BASED POINT CLOUD CODING

CROSS-REFERENCE TO RELATED APPLICATION

This application claims priority from U.S. Provisional Application No. 63/197,196, filed on Jun. 4, 2021, the disclosure of which is incorporated herein by reference in its entirety.

FIELD

This disclosure is directed to a set of advanced video coding technologies, more specifically, video based point cloud compression including conditional recolor color transfer.

BACKGROUND

Advanced three-dimensional (3D) representations of the world are enabling more immersive forms of interaction and communication. They also allow machines to understand, interpret, and navigate our world. Point clouds have been widely used as a 3D representation of the world. For example, they may be used in autonomous driving vehicles for object detection and localization; in geographic information systems (GIS) for mapping, and in cultural heritage to visualize and archive cultural heritage objects and collections, etc. Several use cases associated with point cloud data have been identified, and some corresponding requirements for point cloud representation and compression have been developed.

Point clouds contain a set of high dimensional points, for example three dimensional (3D), each including 3D position information and additional attributes such as color, reflectance, etc. They can be captured using multiple cameras and depth sensors, or Lidar in various setups, and may be made up of thousands up to billions of points to realistically represent the original scenes.

Compression technologies are needed to reduce the amount of data required to represent a point cloud for faster transmission or reduction of storage. ISO/IEC MPEG OTC 1/SC 29/WG 11) has created an ad-hoc group (MPEG-PCC) to standardize the compression techniques for static or dynamic cloud.

SUMMARY

In embodiments, a method of encoding a video stream using video point cloud coding, is performed by at least one processor and includes: obtaining a source point cloud; generating a geometry map and a texture map based on the source point cloud; generating a reconstructed geometry map and a reconstructed texture map using lossy coding and without using recoloring, wherein a resolution of the reconstructed geometry map is same as a resolution of the reconstructed texture map; obtaining a point of the source point cloud corresponding to a geometry pixel of the geometry map and a texture pixel of the texture map; selecting a color of the texture pixel based on a color of the obtained point; and generating an encoded video stream based on the selected color, the geometry map, and the texture map.

In embodiments, an apparatus for encoding a video stream using video point cloud coding includes at least one memory configured to store program code; and at least one processor configured to read the program code and operate as instructed by the program code, the program code comprising: first obtaining code configured to cause the at least one processor to obtain a source point cloud; first generating code configured to cause the at least one processor to generate a geometry map and a texture map based on the source point cloud; second generating code configured to cause the at least one processor to generate a reconstructed geometry map and a reconstructed texture map using lossy coding and without using recoloring, wherein a resolution of the reconstructed geometry map is same as a resolution of the reconstructed texture map; second obtaining code configured to cause the at least one processor to obtain a point of the source point cloud corresponding to a geometry pixel of the geometry map and a texture pixel of the texture map; selecting code configured to cause the at least one processor to select a color of the texture pixel based on a color of the obtained point; and third generating code configured to cause the at least one processor to generate an encoded video stream based on the selected color, the geometry map, and the texture map.

In embodiments, a non-transitory computer-readable medium storing computer instructions encoding a video stream using video point cloud coding that, when executed by at least one processor, cause the at least one processor to: obtain a source point cloud; generate a geometry map and a texture map based on the source point cloud; generate a reconstructed geometry map and a reconstructed texture map using lossy coding and without using recoloring, wherein a resolution of the reconstructed geometry map is same as a resolution of the reconstructed texture map; obtain a point of the source point cloud corresponding to a geometry pixel of the geometry map and a texture pixel of the texture map; select a color of the texture pixel based on a color of the obtained point; and generate an encoded video stream based on the selected color, the geometry map, and the texture map.

BRIEF DESCRIPTION OF THE DRAWINGS

Further features, the nature, and various advantages of the disclosed subject matter will be more apparent from the following detailed description and the accompanying drawings in which:

FIG. 8 illustrates an example of a partially occupied block, in accordance with an embodiment.

DETAILED DESCRIPTION

A consideration behind video-based point cloud compression (V-PCC) is to leverage existing video codecs to compress the geometry, occupancy, and texture of a dynamic point cloud as three separate video sequences. The extra metadata needed to interpret the three video sequences may be compressed separately. A small portion of the overall bitstream is the metadata, which could be encoded/decoded efficiently using software implementation. The bulk of the information may be handled by the video codec.

Embodiments of the present disclosure relate to an annealing iterative geometry smoothing to avoid over-smoothing in an iterative smoothing framework. Embodiments of the present disclosure relate to using a combination of average and median statistics to derive the reference points aiming to reduce the computational complexity of using the pure median.

With reference to FIGS. 1-4, an embodiment of the present disclosure for implementing encoding and decoding structures of the present disclosure are described. The encoding and decoding structures of the present disclosure may implement aspects of V-PCC described above.

Figure 1:
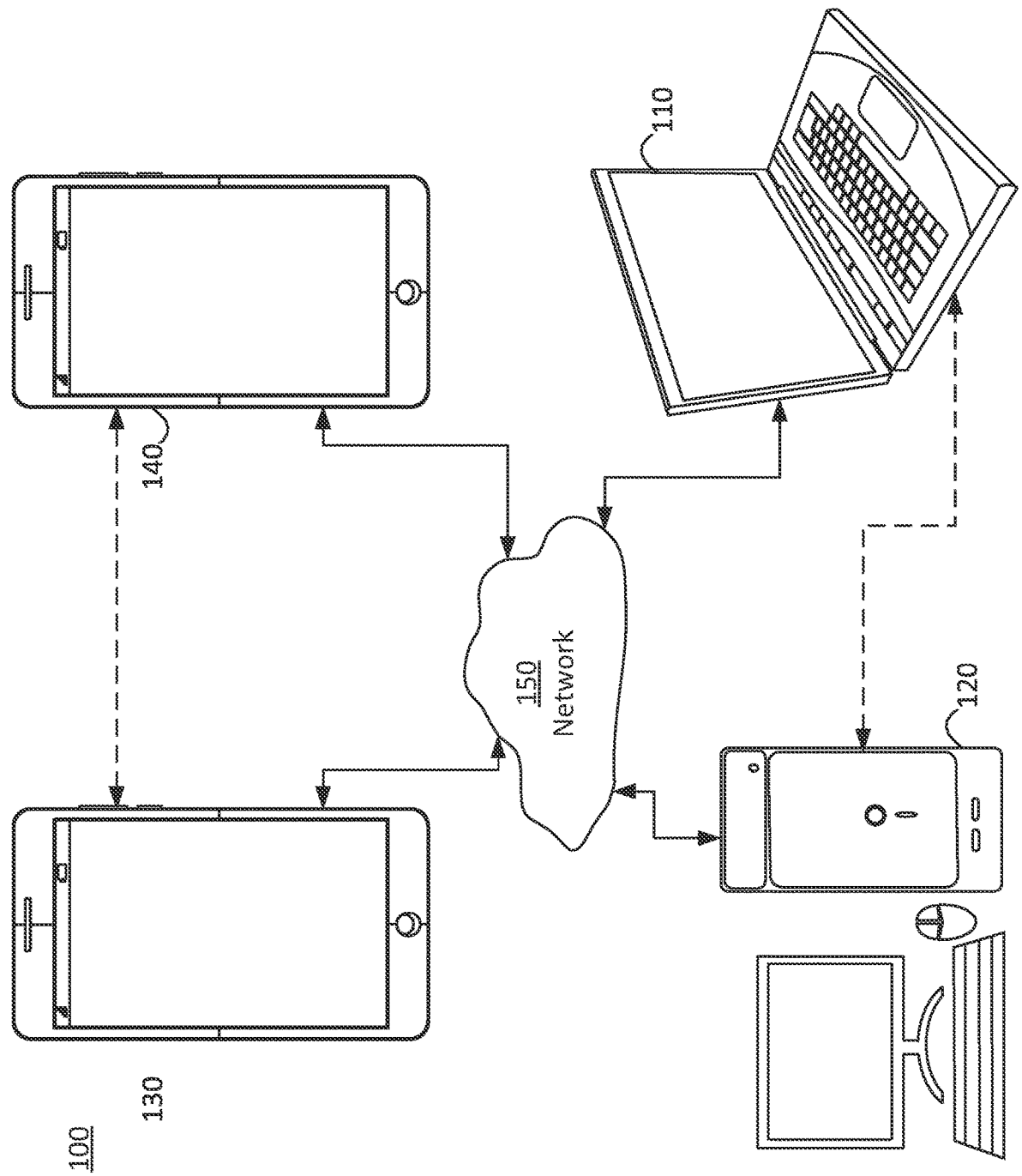
FIG. 1 is a schematic illustration of a simplified block diagram of a communication system in accordance with an embodiment.

FIG. 1 illustrates a simplified block diagram of a communication system 100 according to an embodiment of the present disclosure. The system 100 may include at least two terminals 110, 120 interconnected via a network 150. For unidirectional transmission of data, a first terminal 110 may code video data at a local location for transmission to the other terminal 120 via the network 150. The second terminal 120 may receive the coded video data of the other terminal from the network 150, decode the coded data and display the recovered video data. Unidirectional data transmission may be common in media serving applications and the like, FIG. 1 illustrates a second pair of terminals 130, 140 provided to support bidirectional transmission of coded video that may occur, for example, during videoconferencing. For bidirectional transmission of data, each terminal 130, 140 may code video data captured at a local location for transmission to the other terminal via the network 150. Each terminal 130, 140 also may receive the coded video data transmitted by the other terminal, may decode the coded data and may display the recovered video data at a local display device.

In FIG. 1, the terminals 110-140 may be, for example, servers, personal computers, and smart phones, and/or any other type of terminal. For example, the terminals (110-140) may be laptop computers, tablet computers, media players and/or dedicated video conferencing equipment. The network 150 represents any number of networks that convey coded video data among the terminals 110-140 including, for example, wireline and/or wireless communication networks. The communication network 150 may exchange data in circuit-switched and/or packet-switched channels. Representative networks include telecommunications networks, local area networks, wide area networks, and/or the Internet. For the purposes of the present discussion, the architecture and topology of the network 150 may be immaterial to the operation of the present disclosure unless explained herein below.

Figure 2:
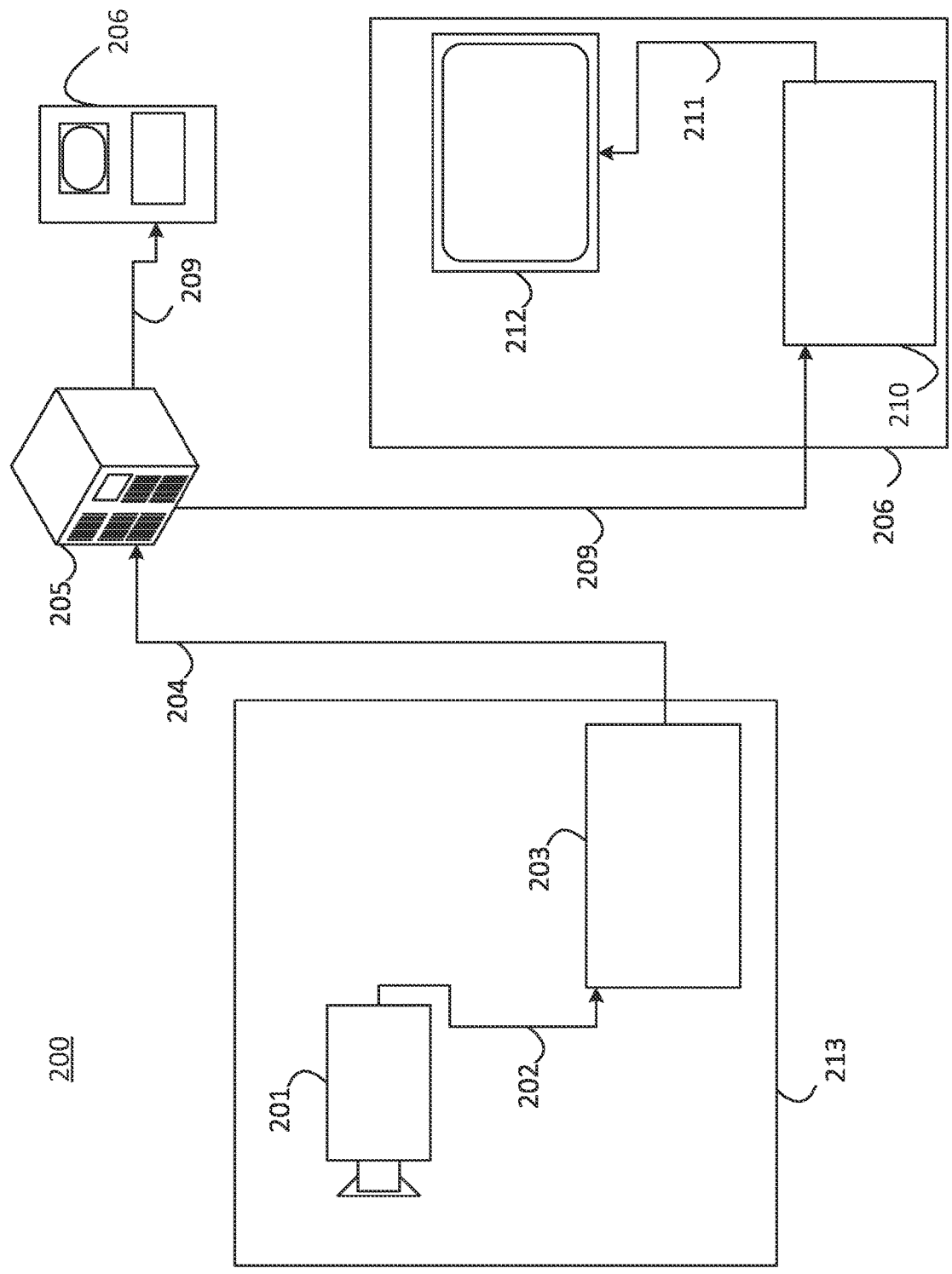
FIG. 2 is a schematic illustration of a simplified block diagram of a streaming system in accordance with an embodiment.

FIG. 2 illustrates, as an example of an application for the disclosed subject matter, a placement of a video encoder and decoder in a streaming environment. The disclosed subject matter can be used with other video enabled applications, including, for example, video conferencing, digital TV, storing of compressed video on digital media including CD, DVD, memory stick and the like, and so on.

As illustrated in FIG. 2, a streaming system 200 may include a capture subsystem 213 that includes a video source 201 and an encoder 203. The streaming system 200 may further include at least one streaming server 205 and/or at least one streaming client 206.

The video source 201 can create, for example, a stream 202 that includes a 3D point cloud corresponding to a 3D video. The video source 201 may include, for example, 3D sensors (e.g. depth sensors) or 3D imaging technology (e.g. digital camera(s)), and a computing device that is configured to generate the 3D point cloud using the data received from the 3D sensors or the 3D imaging technology. The sample stream 202, which may have a high data volume when compared to encoded video bitstreams, can be processed by the encoder 203 coupled to the video source 201. The encoder 203 can include hardware, software, or a combination thereof to enable or implement aspects of the disclosed subject matter as described in more detail below. The encoder 203 may also generate an encoded video bitstream 204. The encoded video bitstream 204, which may have e a lower data volume when compared to the uncompressed stream 202, can be stored on a streaming server 205 for future use. One or more streaming clients 206 can access the streaming server 205 to retrieve video bit streams 209 that may be copies of the encoded video bitstream 204.

The streaming clients 206 can include a video decoder 210 and a display 212. The video decoder 210 can, for example, decode video bitstream 209, which is an incoming copy of the encoded video bitstream 204, and create an outgoing video sample stream 211 that can be rendered on the display 212 or another rendering device (not depicted). In some streaming systems, the video bitstreams 204, 209 can be encoded according to certain video coding/compression standards. Examples of such standards include, but are not limited to, ITU-T Recommendation H.265, Versatile Video Coding (VVC), and MPEG/V-PCC.

Figure 3:
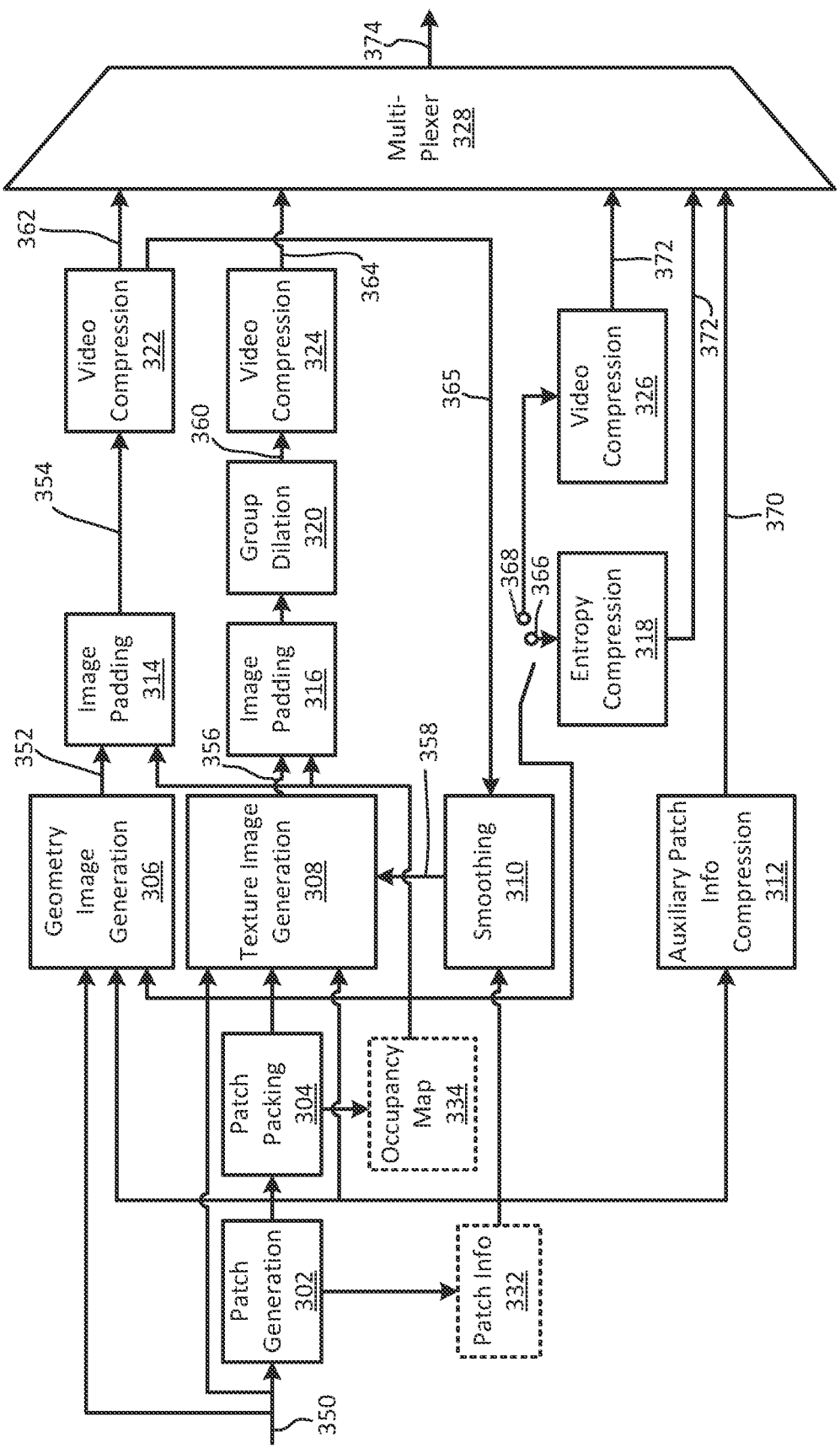
FIG. 3 is a schematic illustration of a simplified block diagram of a video encoder in accordance with an embodiment.
Figure 4:
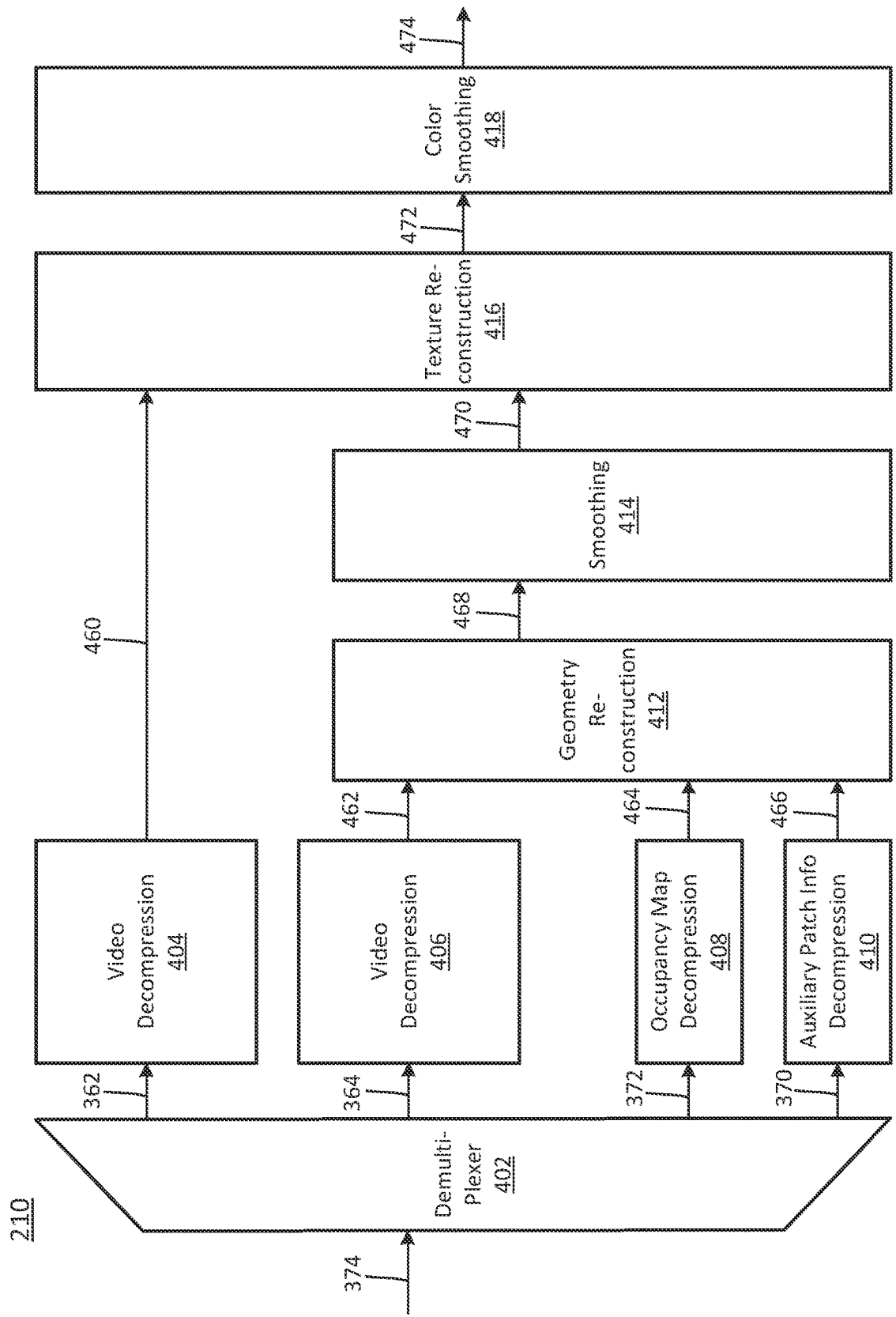
FIG. 4 is a schematic illustration of a simplified block diagram of a video decoder in accordance with an embodiment.

With reference to FIGS. 3-4, some aspects of V-PCC that may be performed by embodiments of the present disclosure are described below.

FIG. 3 illustrates an example functional block diagram of a video encoder 203 according to an embodiment of the present disclosure.

As illustrated in FIG. 3, the video encoder 203 may receive a point cloud frame(s) 350, and generate a geometry image 352, a texture image 356, and an occupancy map 334 based on the point cloud frame 350. The video encoder 203 may compress the geometry image 352 into a compressed geometry image 362, the texture image 356 into a compressed texture image 364, and the occupancy map 334 into a compressed occupancy map 372. A multiplexer 328 of the video encoder 203 may form a compressed bitstream. 374 that includes the compressed geometry image 362, the compressed texture image 364, and the compressed occupancy map 372.

More specifically, in embodiments, the video encoder 203 may include a patch generation module 302 that segments the point cloud frame 350 into patches. Patches are useful entities of V-PCC. The patch generation process includes decomposing the point cloud frame 350 into a minimum number of patches with smooth boundaries, while also minimizing the reconstruction error. Encoders of the present disclosure may implement various methods to generate such a decomposition.

The video encoder 203 may include a patch packing module 304 that performs a packing process. The packing process includes mapping the extracted patches onto a 2D grid while minimizing the unused space and guaranteeing that every M×M 16×16) block of the grid is associated with a unique patch. Efficient patch packing directly impacts the compression efficiency either by minimizing the unused space or ensuring temporal consistency. The patch packing module 304 may generate the occupancy map 334.

The video encoder 203 may include a geometry image generation module 306 and a texture image generation module 308. In order to better handle the case of multiple points being projected to the same sample, each patch may be projected onto two images, referred to as layers. For example, the geometry image generation module 306 and the texture image generation module 308 may exploit the 3D to 2D mapping computed during the packing process of the patch packing module 304 to store the geometry and texture of the point cloud as images (a.k.a. layers). The generated images/layers may be stored as a video frame(s) and compressed using a video codec (e.g. HM video codec) according to configurations provided as parameters.

In embodiments, the geometry image generation module 306 generates the geometry image 352 and the texture image generation module 308 generates the texture image 356, based on the input point cloud frame 350 and the occupancy map 334. In an embodiment, the geometry image 352 may be represented by a monochromatic frame of W×H YUV420-Kbit format. In an embodiment, the occupancy map 334 image consists of a binary map that indicates for each cell of the grid whether it belongs to the empty space or to the point cloud. To generate the texture image 356, the texture image generation module 308 may exploit the reconstructed/smoothed geometry 358 in order to compute the colors to be associated with the re-sampled points.

The video encoder 203 may also include an image padding module 314 and an image padding module 316 for padding the geometry image 352 and the texture image 356, respectively, to form a padded geometry image 354 and a padded texture image 360. The image padding (a.k.a. background filling) simply fills unused space of the images with redundant information. A good background filling is one that minimally increases the bit rate while does not introduce significant coding distortion around the patch boundaries. The image padding module 314 and the image padding module 316 may use the occupancy map 334 to form the padded geometry image 354 and the padded texture image 360, respectively. In an embodiment, the video encoder 203 may include a group dilation module 320 to form the padded texture image 360.

The video encoder 203 may include a video compression module 322 and a video compression module 324 for compressing the padded geometry image 354 and the padded texture image 360 into the compressed geometry image 362 and the compressed texture image 364, respectively.

The video encoder 203 may include an entropy compression module 318 for lossless encoding 366 of the occupancy map 334 and a video compression module 326 for lossy encoding 368 of the occupancy map 334.

In embodiments, the video encoder 203 may include a smoothing module 310 for generating smoothed geometry 358 by using a reconstructed geometry image 365, provided by the video compression module 322, and patch info 332. The smoothing procedure of the smoothing module 310 may aim at alleviating potential discontinuities that may arise at the patch boundaries due to compression artifacts. The smoothed geometry 358 may be used by the texture image generation module 308 to generate the texture image 356.

The video encoder 203 may also include an auxiliary patch information compression module 312 for forming compressed auxiliary patch information 370 that is provided in the compressed bitstream 374 by the multiplexer 328.

FIG. 4 illustrates an example functional block diagram of a video decoder 210 according to an embodiment of the present disclosure.

As illustrated in FIG. 4, the video decoder 210 may receive the coded bitstream 374 from the video encoder 203 to obtain the compressed texture image 362, the compressed geometry image 364, the compressed occupancy map 372, and the compressed auxiliary patch information 370. The video decoder 210 may decode the compressed texture image 362, the compressed geometry image 364, the compressed occupancy map 372, and the compressed auxiliary patch information 370 to obtain a decompressed texture image 460, a decompressed geometry image 462, a decompressed occupancy map 464, and decompressed auxiliary patch information 466, respectively. Following, the video decoder 210 may generate a reconstructed point cloud 474 based on the decompressed texture image 460, the decompressed geometry image 462, the decompressed occupancy map 464, and the decompressed auxiliary patch information 466.

In embodiments, the video decoder 210 may include a demultiplexer 402 that separates the compressed texture image 362, the compressed geometry image 364, the compressed occupancy map 372, and the compressed auxiliary patch information 370 of the compressed bitstream 374 received.

The video decoder 210 may include a video decompression module 404, a video decompression module 406, an occupancy map decompression module 408, and an auxiliary patch information decompression module 410 that decode the compressed texture image 362, the compressed geometry image 364, the compressed occupancy map 372, and the compressed auxiliary patch information 370, respectively.

The video decoder 210 may include a geometry reconstruction module 412 that obtains reconstructed (three dimensional) geometry 468 based on the decompressed geometry image 462, the decompressed occupancy map 464, and the decompressed auxiliary patch information 466.

The video decoder 210 may include a smoothing module 414 that smooths the reconstructed geometry 468 to obtain smoothed geometry 470. The smoothing procedure may aim at alleviating potential discontinuities that may arise at the patch boundaries due to compression artifacts.

The video decoder 210 may include a texture reconstruction module 416 for obtaining reconstructed texture 472 based on the decompressed texture image 460 and the smoothed geometry 470.

The video decoder 210 may include a color smoothing module 418 that smooths the color of the reconstructed texture 472 to obtain a reconstructed point cloud 474. Non-neighboring patches in 3D space are often packed next to each other in 2D videos. This implies that pixel values from non-neighboring patches might be mixed up by the block-based video codec. The color smoothing of the color smoothing module 418 may aim to reduce the visible artifacts that appear at patch boundaries.

Recoloring in Video-Base Point Cloud Compression (V-PCC)

Figure 5:
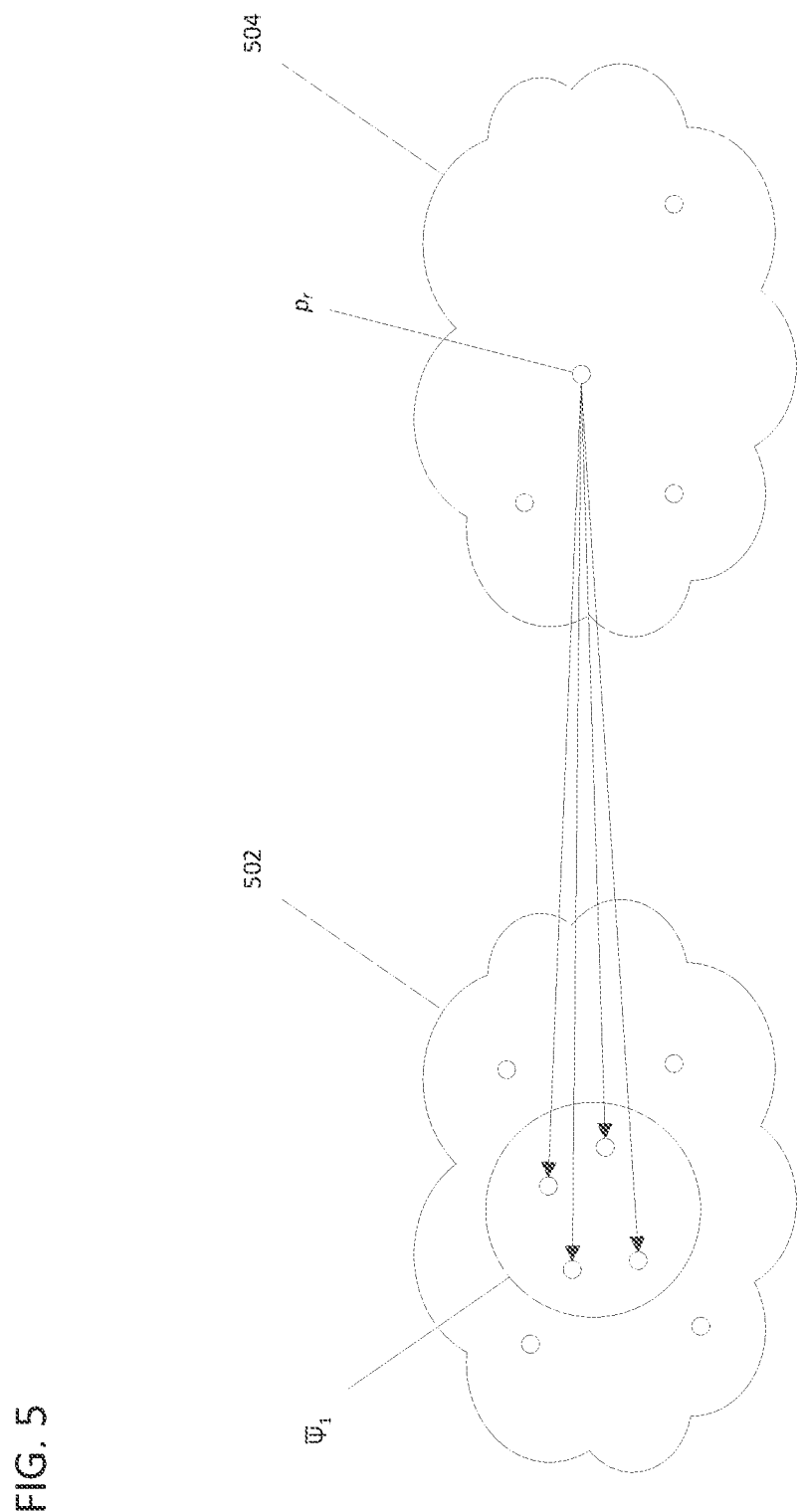
FIG. 5 illustrates an example of a forward search between a source point cloud and a reconstructed point cloud, in accordance with an embodiment.

In the MPEG PCC test model category 2 (TMC2) model, which may correspond to V-PCC, the recoloring process, which may be referred to as, color transferring, may be applied at the encoder-side when the geometry is lossy coded and duplicated positions are merged. An example of the recoloring algorithm is given below, with reference to FIGS. 5 and 6.

Figure 6:
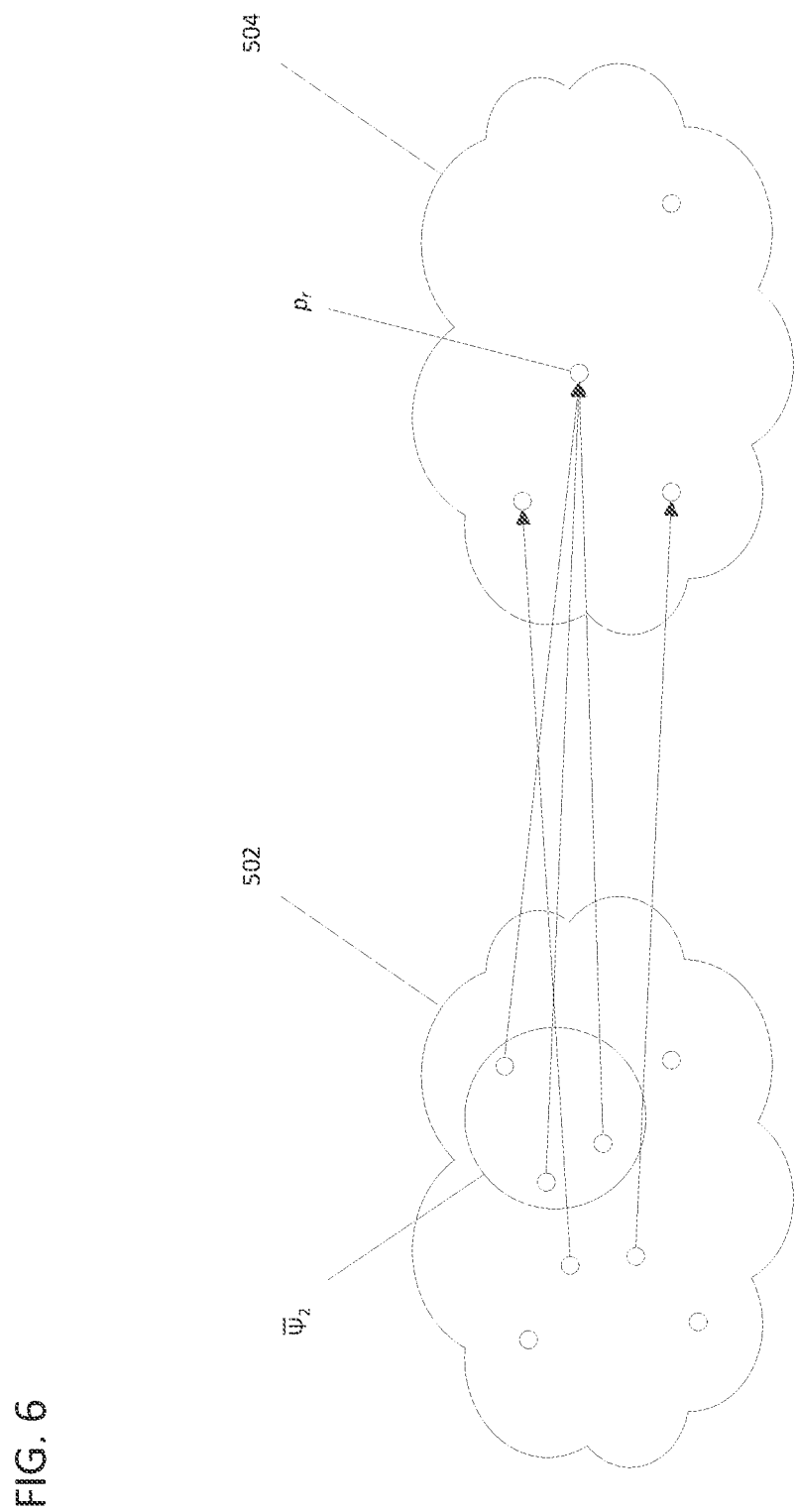
FIG. 6 illustrates an example of a backward search between a source point cloud and a reconstructed point cloud, in accordance with an embodiment.

Given source point cloud 502, attributes, and a target point $p_r$ included in reconstructed point cloud 504, the color transfer procedure, i.e., the recoloring process, may determine the attribute values of the reconstructed point cloud that minimize the attribute distortions. The approach can be implemented as follows:

For each target point $p_r$:
1—Find the $N_1$ ($1 \leq N_1$) nearest neighbor points in source point cloud 502 to $p_r$ and create a set of points denoted by $\psi_1$. This may correspond to a forward search as illustrated in FIG.
2—Find the set of point in source point cloud 502 such that $p_r$ belongs to their set of $N_2$ nearest neighbor points in reconstructed point cloud 504. Denote this set of points by $\psi_2$. This may correspond to a forward search as illustrated in FIG. 6.
3—Compute the distance-weighted average of points in $\psi_1$ and $\psi_2$ by:

$$\overline{\Psi}_k = \frac{\sum_{q \in \Psi_k} \frac{c(q)}{\Delta(q, p_r)}}{\sum_{q \in \Psi_k} \frac{1}{\Delta(q, p_r)}} \qquad \text{Equation (1)}$$

where $\Delta(a, b)$ denotes the Euclidian distance between the points a and b, and c(q) denotes the color of point q.

4—Compute the average (or the weighted average with the number of points of each set as the weights) of $\overline{\psi}_1$ and $\overline{\psi}_2$ and use it as a centroid color.
5—In some embodiments, a backward search from the centroid point may be used to exclude the points if their absolute differences to the centroid color is larger than the threshold $th_c$.
6—In some embodiments, the average (or the weighted average with the number of points of each set as the weights) of $\overline{\psi}_1$ and $\overline{\psi}_7$ may be updated and transferred to $p_r$.

In the current design of TMC2, the recoloring process may be rather complex because a K-dimensional (KD)-tree data structure is utilized in the nearest neighbor search and the recoloring operation is applied to every point in the reconstructed point cloud.

In the current design of TMC2, the recoloring process may be rather complex because a K-dimensional (KD)-tree data structure is utilized in the nearest neighbor search and the recoloring operation is applied to every point in the reconstructed point cloud. In embodiments, the entire recoloring process may be bypassed by generating texture maps from the original point cloud directly. In embodiments, the recoloring process may be applied conditionally. For example, the recoloring process may be applied to regions that have larger geometry distortions due to lossy geometry compression.

Embodiments disclosed herein may be used separately or combined in any order. Further, each of the embodiments, for example encoders and decoders, may be implemented by processing circuitry (e.g., one or more processors or one or more integrated circuits). In one example, the one or more processors execute a program that is stored in a non-transitory computer-readable medium.

Bypass Recoloring

Figure 7A:
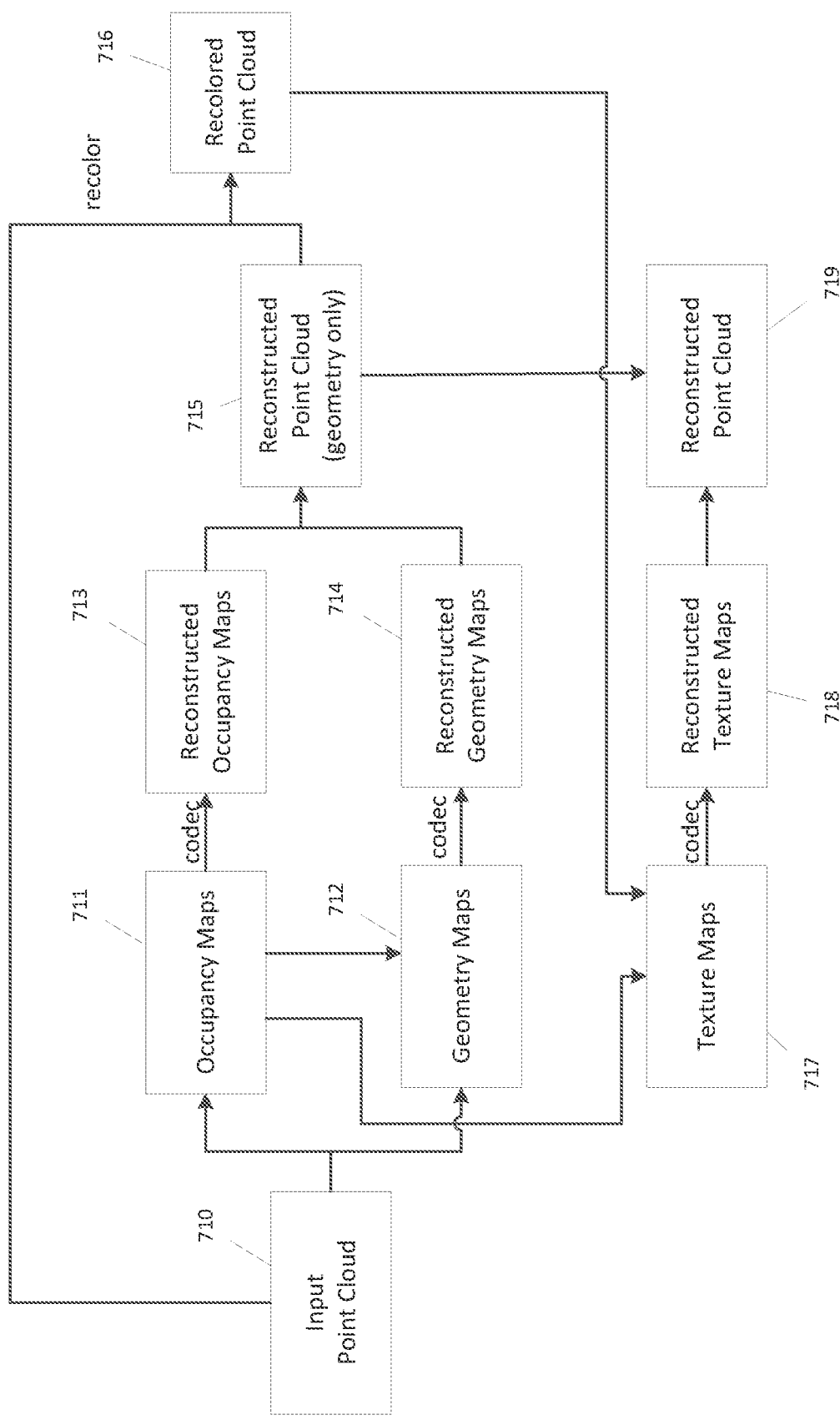
FIG. 7A illustrates an example of an encoder pipeline with recoloring, in accordance with an embodiment.

As shown in FIG. 7A, in V-PCC, recoloring may be applied when the geometry is lossy coded, and the colors in the reconstructed point cloud are recalculated, or for example interpolated, based on the reconstructed geometry. Then, the texture maps are generated based on the recolored point cloud.

For example, as can be seen in FIG. 7A, in a process 700A in which recoloring is used, occupancy maps 711 and geometry maps 712 may be generated from the input point cloud 710. Then reconstructed occupancy maps 713 and reconstructed geometry maps 714 may be generated using lossy coding, and a geometry-reconstructed point cloud 715 may be generated based on the reconstructed occupancy maps 713 and the reconstructed geometry maps 714. This geometry-reconstructed point cloud 715 may be recolored using the input point cloud 710 to generate recolored point cloud 716, and this recolored point cloud 716 may be used with the occupancy maps 711 to generate texture maps 717. Reconstructed texture maps 718 may be generated using lossy coding, and a reconstructed point cloud 719 may be generated using the reconstructed texture maps 718 and the geometry-reconstructed point cloud 715.

In embodiments, texture maps can be directly generated from the input point cloud when generating the geometry maps, and then the generated occupancy, geometry and texture maps may be coded and reconstructed. An example of this is illustrated in FIG. 7B, where the recoloring process can be completely removed, and the overall workflow is much simplified.

Figure 7B:
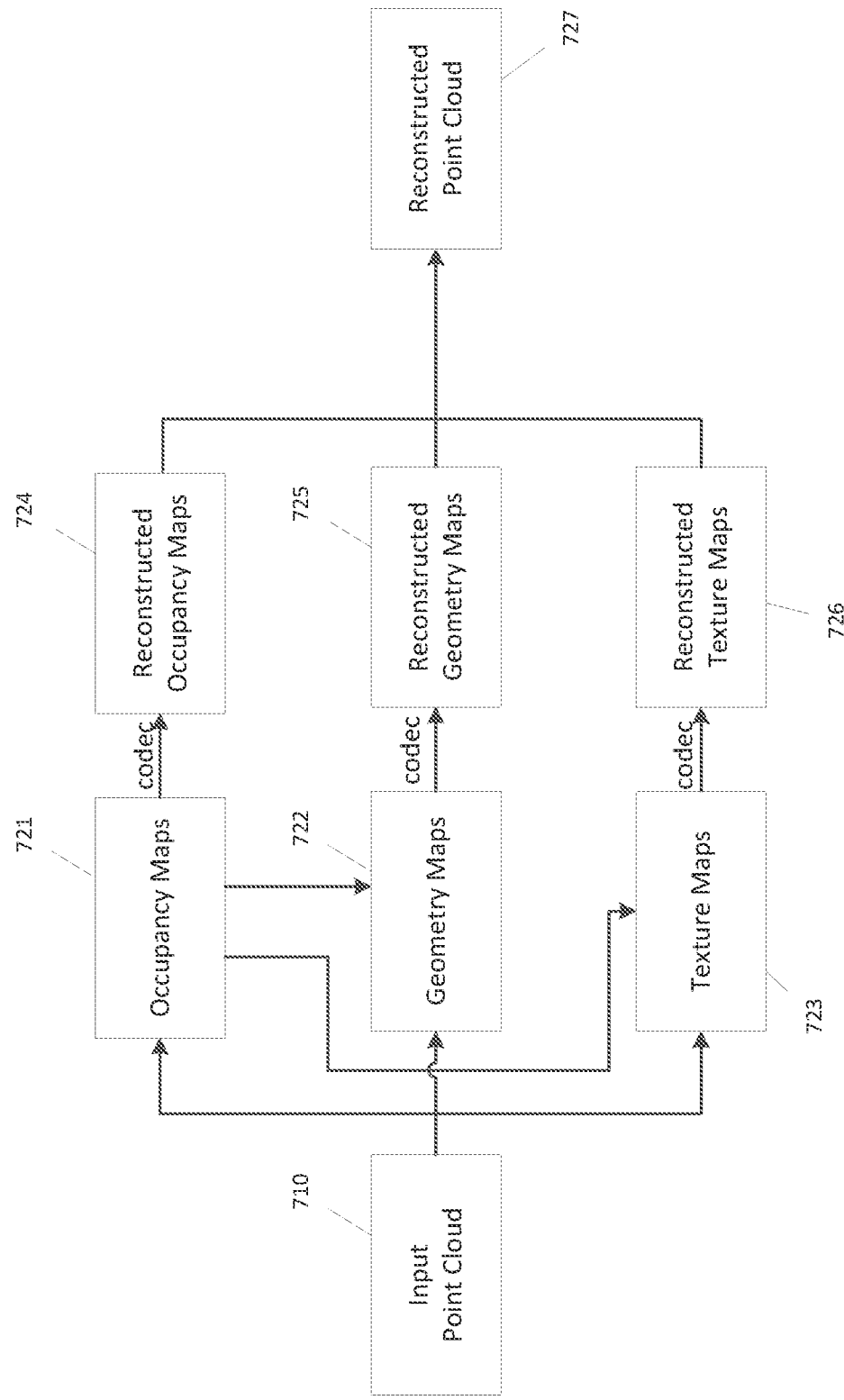
FIG. 7B illustrates an example of an encoder pipeline without recoloring, in accordance with an embodiment.

For example as can be seen in FIG. 7B, in a process 700B in which recoloring is not used, occupancy maps 721, geometry maps 722, and texture maps 723 may be generated directly from the input point cloud 710, and reconstructed occupancy maps 721, reconstructed geometry maps 722, and reconstructed texture maps 723 may be generated using lossy coding. Then, reconstructed point cloud 727 may be generated using the reconstructed occupancy maps 721, reconstructed geometry maps 722, and reconstructed texture maps 723.

In embodiments, the texture maps may be generated with the geometry maps. The texture maps may have the same resolutions as the geometry maps, and they share the same atlas information. Suppose $T_{x,y}$ is an occupied pixel in texture map and $G_{x,y}$ is the corresponding pixel in geometry map, and they correspond to a same point P in 3D space. The original color value of P can be then assigned as the value of $T_{x,y}$.

If the occupancy maps are lossy coded, the texture maps generated by bypass recoloring may be further processed based on the reconstructed occupancy maps. Accordingly, the "semi-occupied" pixels, which are occupied in the reconstructed full-size occupancy map but is unoccupied in the original full-size occupancy map, may be filled with some values.

The distortion of occupancy maps may be caused by two major factors, i.e., the occupancy map down-sampling and the lossy compression of occupancy maps. Suppose the occupancy map is lossless coded with a precision of B×B blocks, where B>1 is an integer. In this case, when an occupancy map block is occupied by at least one point, all the points of the block in the reconstructed occupancy map will be occupied.

Figure 8:
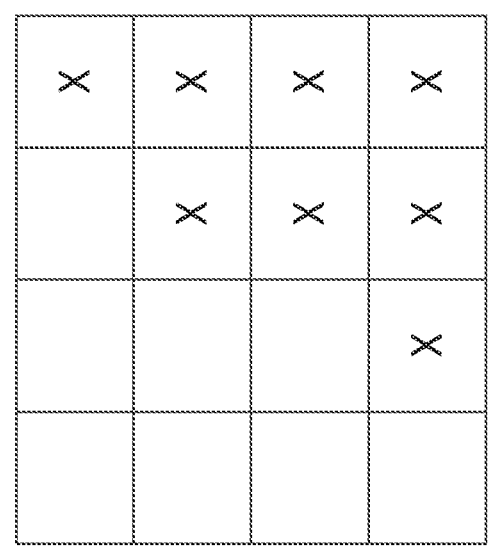

Consider an example in which B=4. As shown in FIG. 8, a 4×4 block is partially occupied, where the pixels marked as "X" are occupied and their corresponding pixels in texture map are valid. The remaining pixels are defined as "semi-occupied" because they are unoccupied in the original occupancy map but occupied in the reconstructed occupancy map. Thus, in the reconstructed block, the "semi-occupied" pixels will be regarded as occupied. In embodiments, the "semi-occupied" pixels may be filled with appropriate values to improve the reconstruction quality. The filled values can be determined by the occupied pixels in the image.

In embodiments, the filling process of "semi-occupied" pixels are performed in the B×B non-overlapped block basis. For each B×B block, the "semi-occupied" pixels are filled with the average value of the occupied pixels in the same block.

In embodiments, the filling process of "semi-occupied" pixels are performed in the B×B non-overlapped block basis. For each B×B block, the "semi-occupied" pixels are filled with the average value of a number of nearest neighbors that are occupied in the same block. The averaging can be weighted by the distance to the filled pixel.

In embodiments, the filling process of "semi-occupied" pixels are performed over the entire image. For each "semi-occupied" pixel, it can be filled with the average value of a number of nearest neighbors that are occupied in the image. The averaging can be weighted by the distance to the filled pixel.

Conditional Recoloring

Conditional recolor may involve a tradeoff between the normal recolor and the bypass recolor schemes. In embodiments, part of the pixels in texture maps can be derived directly from the original point cloud by bypass recoloring scheme, and the rest of the pixels may be derived from the reconstructed point cloud by normal recoloring algorithm. The decision on the method applied to a pixel may rely on the geometry distortion of the corresponding point in 3D. For example, if the geometry distortion is large, the normal recolor is applied, otherwise bypass recolor is applied. Note that the geometry distortion is composed of the distortion in geometry maps and the distortion in occupancy maps.

In embodiments, if the geometry, for example the geometry and occupancy maps, is lossless coded, the bypass recolor may be applied for all pixels of texture map and the normal recolor scheme can be omitted.

In embodiments, the "semi-occupied" pixels may be processed by the normal recolor scheme.

In embodiments, all pixels of a B×B block that contains at least a "semi-occupied" pixel may be processed by the normal recolor scheme.

In embodiments, the original geometry maps and the corresponding reconstructed geometry maps after compression may be compared. For a given 2D position, if the corresponding pixel values in geometry maps differ greatly due to compression, the corresponding pixel in texture map may be processed by normal recolor scheme; otherwise, it may be processed by bypass recolor scheme. A threshold may be defined to determine if a geometry change is large or not. The threshold may be fixed for all sequences, or may be changed for every sequence, or can be adaptively updated for every sequence. The threshold can be sent in the bitstream as high level syntax information or meta data.

Note that any combinations of the conditions in the embodiments disclosed herein may be applied.

Accordingly, in embodiments, texture maps can be directly generated from the input point cloud without recoloring from the reconstructed point cloud, which may be referred to as a bypass recoloring scheme. If the occupancy maps are lossy coded, the texture maps generated by bypass recoloring may be further processed based on the reconstructed occupancy maps. A goal may be to fill the "semi-occupied" pixels, which are occupied in the reconstructed full-size occupancy map but is unoccupied in the original full-size occupancy map, with some values. The filled value can be determined by the occupied pixels in the image. The filling process of "semi-occupied" pixels can be performed in the B×B non-overlapped block basis. The filling process of "semi-occupied" pixels can be performed over the entire image.

In embodiments, part of pixels in texture maps can be derived directly from the original point cloud by bypass recoloring scheme, and the rest of the pixels are derived from the reconstructed point cloud by normal recoloring algorithm, which may be referred to as a conditional recoloring scheme. The decision on the method applied to a pixel can rely on the geometry distortion of the corresponding point in 3D. If the geometry distortion is large, the normal recolor may be applied, otherwise bypass recolor may be applied. Note that the geometry distortion may include the distortion in geometry maps and the distortion in occupancy maps.

Figure 9A:
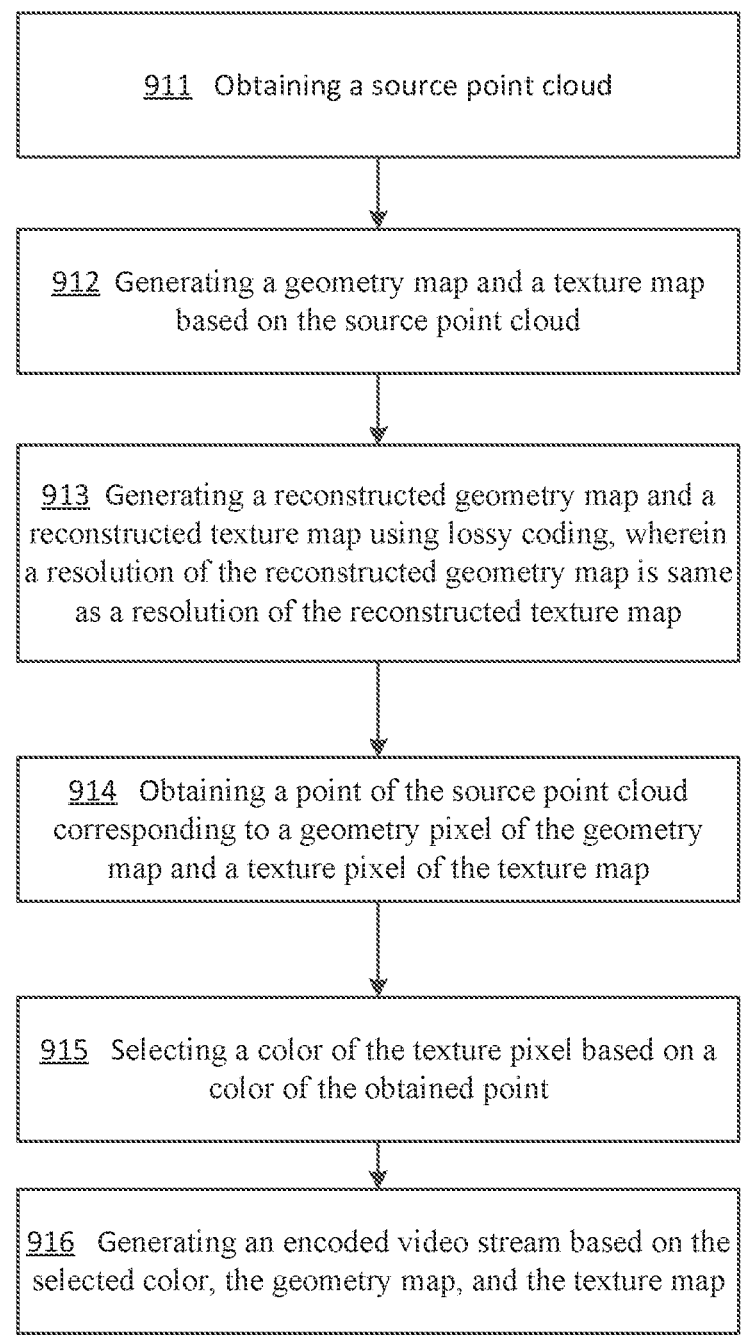
FIGS. 9A-9B are flow diagrams illustrating processes performed by an embodiment.

FIG. 9A is a flowchart of a method 900A of encoding a video stream using video point cloud coding. In some implementations, one or more process blocks of FIG. 9A may be performed by encoder 203. In some implementations, one or more process blocks of FIG. 9A may be performed by another device or a group of devices separate from or including the encoder 203, such as the decoder 210.

As shown in FIG. 9A, in operation 911, the method 900A may include obtaining a source point cloud.

In operation 912, the method 900A may include generating a geometry map and a texture map based on the source point cloud.

In operation 913, the method 900A may include generating a reconstructed geometry map and a reconstructed texture map using lossy coding, wherein a resolution of the reconstructed geometry map is same as a resolution of the reconstructed texture map. In embodiments, the reconstructed geometry map and the reconstructed texture map may be generated without using recoloring.

In operation 914, the method 900A may include obtaining a point of the source point cloud corresponding to a geometry pixel of the geometry map and a texture pixel of the texture map.

In operation 915, the method 900A may include selecting a color of the texture pixel based on a color of the obtained point.

In operation 916, the method 900A may include generating an encoded video stream based on the selected color, the geometry map, and the texture map.

Figure 9B:
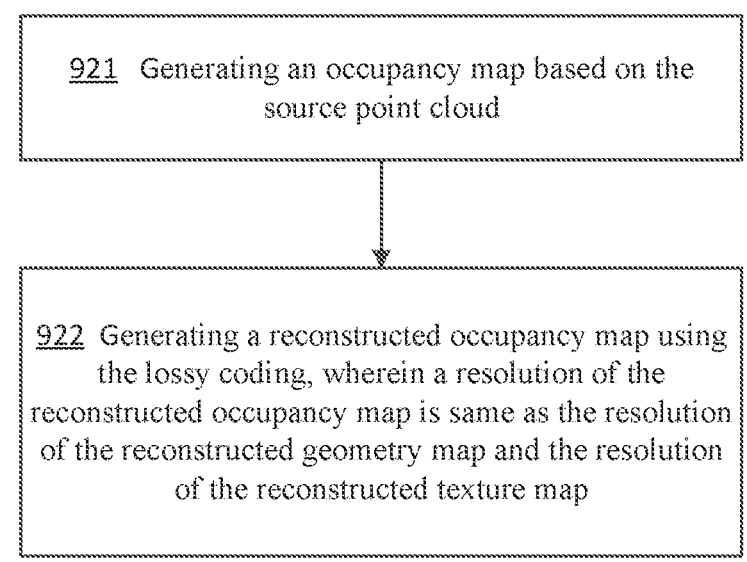

FIG. 9B is a flowchart of a method 900B of encoding a video stream using video point cloud coding. In some implementations, one or more process blocks of FIG. 9B may be performed by encoder 203. In some implementations, one or more process blocks of FIG. 9B may be performed by another device or a group of devices separate from or including the encoder 203, such as the decoder 210.

As shown in FIG. 9B, in operation 921, the method 900B may include generating an occupancy map based on the source point cloud.

In operation 922, the method 900B may include generating a reconstructed occupancy map using the lossy coding, wherein a resolution of the reconstructed occupancy map is same as the resolution of the reconstructed geometry map and the resolution of the reconstructed texture map. In embodiments, the reconstructed occupancy map may be generated without using recoloring.

In embodiments, the color of the texture pixel ma be selected based on the occupancy map.

In embodiments, the texture pixel may correspond to a semi-occupied pixel which is not occupied in the occupancy map and which is occupied in the reconstructed occupancy map, and the color of the texture pixel may be selected based on an average value of a plurality of occupied pixels in a same block.

In embodiments, the texture pixel may correspond to a semi-occupied pixel which is not occupied in the occupancy map and which is occupied in the reconstructed occupancy map, and the color of the texture pixel may be selected based on a distance-weighted average value of a plurality of nearest neighboring occupied pixels.

In embodiments, the texture pixel may correspond to an occupied pixel which is occupied in the occupancy map and which is occupied in the reconstructed occupancy map, and a color value of a semi-occupied pixel which is not occupied in the occupancy map and which is occupied in the reconstructed occupancy map may be determined using recoloring.

In embodiments, a plurality of color values of a plurality of pixels included in a block including the semi-occupied pixel may be determined using the recoloring.

In embodiments, the point may be obtained based on a comparison between the geometry map and the reconstructed geometry map.

Although FIGS. 9A-9B shows example blocks of the methods 900A and 900B, in some implementations, the methods 900A and 900B may include additional blocks, fewer blocks, different blocks, or differently arranged blocks than those depicted in FIGS. 9A-9B Additionally, or alternatively, two or more of the blocks of the method 900.A may be performed in parallel. In embodiments, any of the blocks of FIGS. 9A-9B may be combined in any order or amount with any other block or blocks of FIGS. 9A-9B, as desired.

Figure 10:
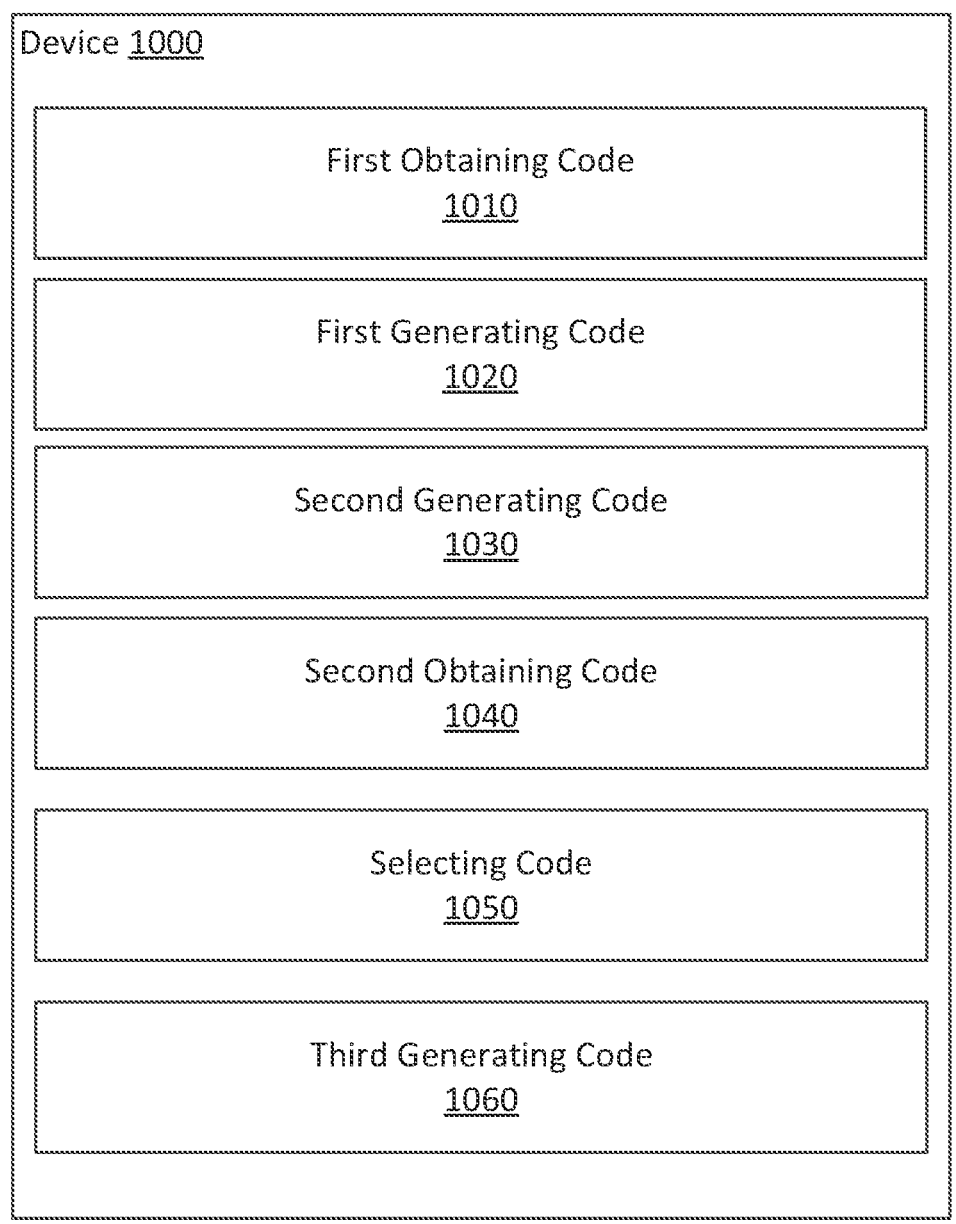
FIG. 10 is a diagram illustrating a device in accordance with an embodiment.

FIG. 10 is a diagram of an apparatus 1000 for encoding a video stream using video point cloud coding, according to embodiments. As shown in FIG. 10, the apparatus 800 includes first obtaining code 1010, first generating code 1020, second generating code 1030, second obtaining code 1040, selecting code 1050, and third generating code 1060.

The first obtaining code 1010 may be configured to cause the at least one processor to obtain a source point cloud.

The first generating code 1020 may be configured to cause the at least one processor to generate a geometry map and a texture map based on the source point cloud.

The second generating code 1030 may be configured to cause the at least one processor to generate a reconstructed geometry map and a reconstructed texture map using lossy coding, wherein a resolution of the reconstructed geometry map is same as a resolution of the reconstructed texture map.

The second obtaining code 1040 may be configured to cause the at least one processor to obtain a point of the source point cloud corresponding to a geometry pixel of the geometry map and a texture pixel of the texture map.

The selecting code 1050 may be configured to cause the at least one processor to select a color of the texture pixel based on a color of the obtained point.

The third generating code 1060 may be configured to cause the at least one processor to generate an encoded video stream based on the selected color, the geometry map, and the texture map.

The techniques, described above, can be implemented as computer software using computer-readable instructions and physically stored in one or more computer-readable media. For example, FIG. 11 shows a computer system 1100 suitable for implementing certain embodiments of the disclosure.

The computer software can be coded using any suitable machine code or computer language, that may be subject to assembly, compilation, linking, or like mechanisms to create code comprising instructions that can be executed directly, or through interpretation, micro-code execution, and the like, by computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 11:
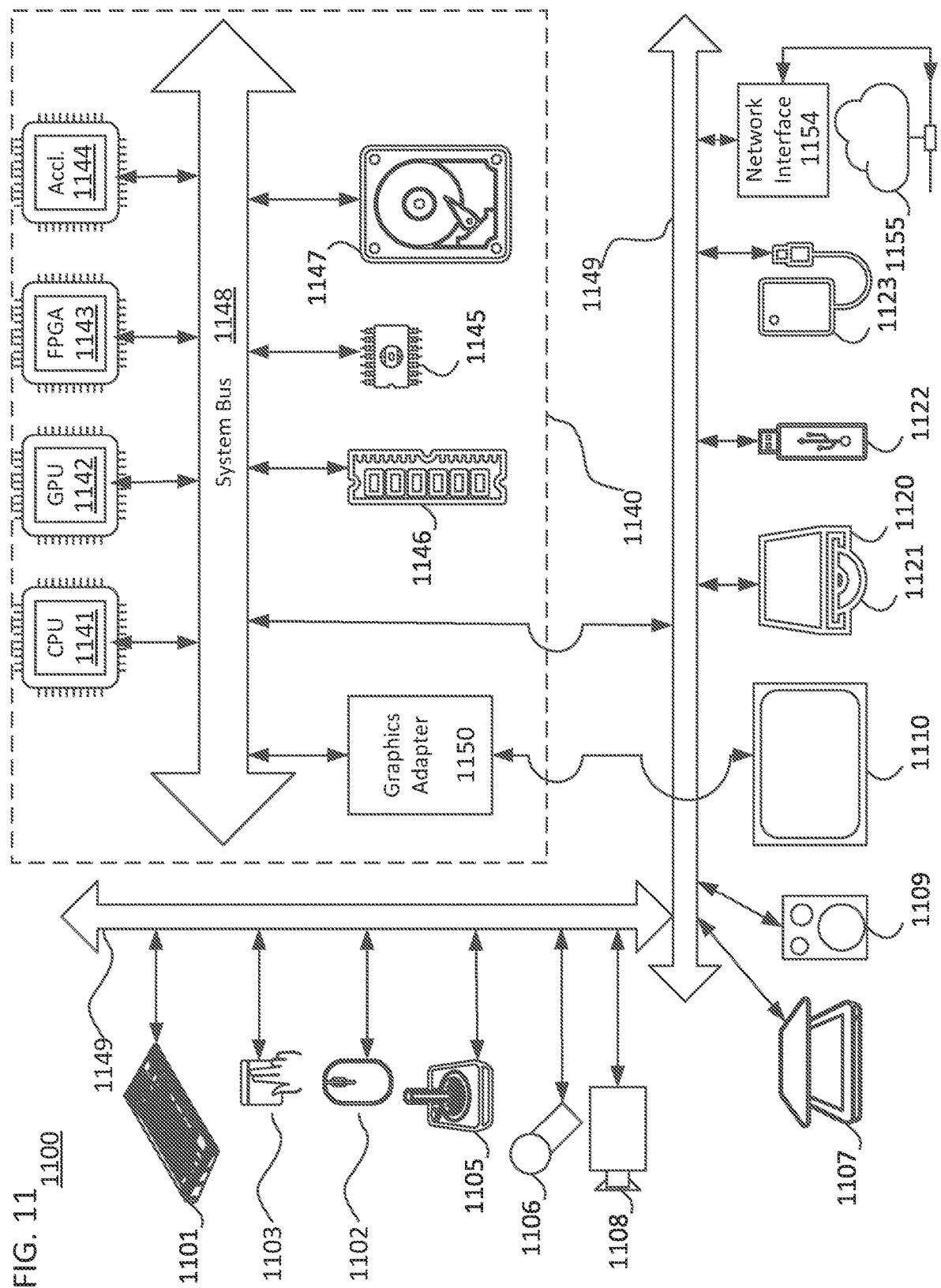
FIG. 11 is a diagram of a computer system suitable for implementing embodiments.

The components shown in FIG. 11 for computer system 1100 are examples and are not intended to suggest any limitation as to the scope of use or functionality of the computer software implementing embodiments of the present disclosure. Neither should the configuration of components be interpreted as having any dependency or requirement relating to any one or combination of components illustrated in the non-limiting embodiment of a computer system 1100.

Computer system 1100 may include certain human interface input devices. Such man interface input device may be responsive to input by one or more human users through, for example, tactile input (such as: keystrokes, swipes, data glove movements), audio input (such as: voice, clapping), visual input (such as: gestures), olfactory input (not depicted). The human interface devices can also be used to capture certain media not necessarily directly related to conscious input by a human, such as audio (such as: speech, music, ambient sound), images (such as: scanned images, photographic images obtain from a still image camera), video (such as two-dimensional video, three-dimensional video including stereoscopic video).

Input human interface devices may include one or more of (only one of each depicted): keyboard 1101, mouse 1102, trackpad 1103, touch screen 1110, data-glove, joystick 1105, microphone 1106, scanner 1107, camera 1108.

Computer system 1100 may also include certain human interface output devices. Such human interface output devices may be stimulating the senses of one or more human users through, for example, tactile output, sound, light, and smell/taste. Such human interface output devices may include tactile output devices (for example tactile feedback by the touch-screen 1110, data glove, or joystick 1105, but there can also be tactile feedback devices that do not serve as input devices). For example, such devices may be audio output devices (such as: speakers 1109, headphones (not depicted)), visual output devices (such as screens 1110 to include CRT screens, LCD screens, plasma screens, OLED screens, each with or without touch-screen input capability, each with or without tactile feedback capability some of which may be capable to output two dimensional visual output or more than three dimensional output through means such as stereographic output; virtual-reality glasses (not depicted), holographic displays and smoke tanks (not depicted)), and printers (not depicted).

Computer system 1100 can also include human accessible storage devices and their associated media such as optical media including CD/DVD ROM/RW 1120 with CD/DVD or the like media 1121, thumb-drive 1122, removable hard drive or solid state drive 1123, legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system 1100 can also include interface to one or more communication networks. Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CANBus, and so forth. Certain networks commonly require external network interface adapters that attached to certain general purpose data ports or peripheral buses 1149 (such as, for example USB ports of the computer system 1100; others are commonly integrated into the core of the computer system 1100 by attachment to a system bus as described below (for example Ethernet interface into a PC computer system or cellular network interface into a smartphone computer system). Using any of these networks, computer system 1100 can communicate with other entities. Such communication can be uni-directional, receive only (for example, broadcast TV), uni-directional send-only (for example CANbus to certain CANbus devices), or bi-directional, for example to other computer systems using local or wide area digital networks. Such communication can include communication to a cloud computing environment 1155. Certain protocols and protocol stacks can be used on each of those networks and network interfaces as described above.

Aforementioned human interface devices, human-accessible storage devices, and network interfaces 1154 can be attached to a core 1140 of the computer system 1100.

The core 1140 can include one or more Central Processing Units (CPU) 1141, Graphics Processing Units (GPU) 1142, specialized programmable processing units in the form of Field Programmable Gate Areas (FPGA) 1143, hardware accelerators tier certain tasks 1144, and so forth. These devices, along with Read-only memory (ROM) 1145, Random-access memory 1146, internal mass storage such as internal non-user accessible hard drives, SSDs, and the like 1147, may be connected through a system bus 1148, In some computer systems, the system bus 1148 can be accessible in the firm of one or more physical plugs to enable extensions by additional CPUs, GPU, and the like. The peripheral devices can be attached either directly to the core's system bus 1148, or through a peripheral bus 1149. Architectures for a peripheral bus include PCI, USB, and the like. A graphics adapter 1150 may be included in the core 1140.

CPUs 1141, GPUs 1142, FPGAs 1143, and accelerators 1144 can execute certain instructions that, in combination, can make up the aforementioned computer code. That computer code can be stored in ROM 1145 or RAM 1146. Transitional data can also be stored in RAM 1146, whereas permanent data can be stored for example, in the internal mass storage 1147. Fast storage and retrieve to any of the memory devices can be enabled through the use of cache memory, that can be closely associated with one or more CPU 1141, GPU 1142, mass storage 1147. ROM 1145, RAM 1146, and the like.

The computer readable media can have computer code thereon for performing various computer-implemented operations. The media and computer code can be those specially designed and constructed for the purposes of the present disclosure, or they can be of the kind well known and available to those having skill in the computer software arts.

As an example and not by way of limitation, the computer system having architecture 1100, and specifically the core 1140 can provide functionality as a result of processor(s) (including CPUs. GPUs, FPGA, accelerators, and the like) executing software embodied in one or more tangible, computer-readable media. Such computer-readable media can be media associated with user-accessible mass storage as introduced above, as well as certain storage of the core 1140 that are of non-transitory nature, such as core-internal mass storage 1147 or ROM 1145. The software implementing various embodiments of the present disclosure can be stored in such devices and executed by core 1140. A computer-readable medium can include one or more memory devices or chips, according to particular needs. The software can cause the core 1140 and specifically the processors therein (including CPU, GPU, FPGA, and the like) to execute particular processes or particular parts of particular processes described herein, including defining data structures stored in RAM 1146 and modifying such data structures according to the processes defined by the software. In addition or as an alternative, the computer system can provide functionality as a result of logic hardwired or otherwise embodied in a circuit (for example: accelerator 1144), which can operate in place of or together with software to execute particular processes or particular parts of particular processes described herein. Reference to software can encompass logic, and vice versa, where appropriate. Reference to a computer-readable media can encompass a circuit (such as an integrated circuit (IC)) storing software for execution, a circuit embodying logic for execution, or both, where appropriate. The present disclosure encompasses any suitable combination of hardware and software.

While this disclosure has described several non-limiting embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method of encoding a video stream using video point cloud coding, the method being performed by at least one processor and comprising:
   obtaining a source point cloud;
   generating a geometry map and a texture map based on the source point cloud;
   generating a reconstructed geometry map and a reconstructed texture map using lossy coding,
      wherein the reconstructed geometry map and the reconstructed texture map are generated without using recoloring, and
      wherein a resolution of the reconstructed geometry map is same as a resolution of the reconstructed texture map;
   obtaining a point of the source point cloud corresponding to a geometry pixel of the geometry map and a texture pixel of the texture map;
   selecting a color of the texture pixel corresponding to a color of the obtained point, wherein the texture pixel corresponds to a semi-occupied pixel which is not occupied in an occupancy map and which is occupied in a reconstructed occupancy map, and wherein the color of the texture pixel is selected based on an average value of a plurality of occupied pixels in a same block of the occupancy map, wherein the block of the occupancy map is a precision with which the occupancy map is coded; and generating an encoded video stream based on the selected color, the geometry map, and the texture map.

2. The method of claim 1, further comprising:

generating the occupancy map based on the source point cloud;

generating the reconstructed occupancy map using the lossy coding and without using the recoloring, wherein a resolution of the reconstructed occupancy map is same as the resolution of the reconstructed geometry map and the resolution of the reconstructed texture map, wherein the color of the texture pixel is selected based on the occupancy map.

3. The method of claim 1, wherein the color of the texture pixel is selected based on a distance-weighted average value of a plurality of nearest neighboring occupied pixels of the same block.

4. The method of claim 1, wherein a color value of the semi-occupied pixel which is not occupied in the occupancy map and which is occupied in the reconstructed occupancy map is determined using the recoloring.

5. The method of claim 4, wherein a plurality of color values of a plurality of pixels included in a block including the semi-occupied pixel are determined using the recoloring.

6. The method of claim 1, wherein the point is obtained based on a comparison between the geometry map and the reconstructed geometry map.

7. An apparatus for encoding a video stream using video point cloud coding, the apparatus comprising:

at least one memory configured to store program code; and at least one processor configured to read the program code and operate as instructed by the program code, the program code comprising:

first obtaining code configured to cause the at least one processor to obtain a source point cloud;

first generating code configured to cause the at least one processor to generate a geometry map and a texture map based on the source point cloud;

second generating code configured to cause the at least one processor to generate a reconstructed geometry map and a reconstructed texture map using lossy coding, wherein the reconstructed geometry map and the reconstructed texture map are generated without using recoloring, and wherein a resolution of the reconstructed geometry map is same as a resolution of the reconstructed texture map;

second obtaining code configured to cause the at least one processor to obtain a point of the source point cloud corresponding to a geometry pixel of the geometry map and a texture pixel of the texture map;

selecting code configured to cause the at least one processor to select a color of the texture pixel corresponding to a color of the obtained point, wherein the texture pixel corresponds to a semi-occupied pixel which is not occupied in an occupancy map and which is occupied in a reconstructed occupancy map, and wherein the color of the texture pixel is selected based on an average value of a plurality of occupied pixels in a same block of the occupancy map, wherein the block of the occupancy map is a precision with which the occupancy map is coded; and third generating code configured to cause the at least one processor to generate an encoded video stream based on the selected color, the geometry map, and the texture map.

8. The apparatus of claim 7, further comprising:

third generating code configured to cause the at least one processor to generate the occupancy map based on the source point cloud;

fourth generating code configured to cause the at least one processor to generate the reconstructed occupancy map using the lossy coding and without using the recoloring, wherein a resolution of the reconstructed occupancy map is same as the resolution of the reconstructed geometry map and the resolution of the reconstructed texture map, wherein the color of the texture pixel is selected based on the occupancy map.

9. The apparatus of claim 7, wherein the color of the texture pixel is selected based on a distance-weighted average value of a plurality of nearest neighboring occupied pixels of the same block.

10. The apparatus of claim 7, wherein a color value of the semi-occupied pixel which is not occupied in the occupancy map and which is occupied in the reconstructed occupancy map is determined using the recoloring.

11. The apparatus of claim 10, wherein a plurality of color values of a plurality of pixels included in a block including the semi-occupied pixel are determined using the recoloring.

12. The apparatus of claim 7, wherein the point is obtained based on a comparison between the geometry map and the reconstructed geometry map.

13. A non-transitory computer-readable medium storing computer instructions encoding a video stream using video point cloud coding that, when executed by at least one processor, cause the at least one processor to:

obtain a source point cloud;

generate a geometry map and a texture map based on the source point cloud;

generate a reconstructed geometry map and a reconstructed texture map using lossy coding, wherein the reconstructed geometry map and the reconstructed texture map are generated without using recoloring, and wherein a resolution of the reconstructed geometry map is same as a resolution of the reconstructed texture map;

obtain a point of the source point cloud corresponding to a geometry pixel of the geometry map and a texture pixel of the texture map;

select a color of the texture pixel corresponding to a color of the obtained point, wherein the texture pixel corresponds to a semi-occupied pixel which is not occupied in an occupancy map and which is occupied in a reconstructed occupancy map, and wherein the color of the texture pixel is selected based on an average value of a plurality of occupied pixels in a same block of the occupancy map, wherein the block of the occupancy map is a precision with which the occupancy map is coded; and generate an encoded video stream based on the selected color, the geometry map, and the texture map.

14. The non-transitory computer-readable medium of claim 13, further comprising:

generate the occupancy map based on the source point cloud;

generate the reconstructed occupancy map using the lossy coding and without using the recoloring, wherein a resolution of the reconstructed occupancy map is same as the resolution of the reconstructed geometry map and the resolution of the reconstructed texture map, wherein the color of the texture pixel is selected based on the occupancy map.

15. The non-transitory computer-readable medium of claim 13, wherein the color of the texture pixel is selected based on a distance-weighted average value of a plurality of nearest neighboring occupied pixels of the same block.

16. The non-transitory computer-readable medium of claim 13, wherein a color value of the semi-occupied pixel which is not occupied in the occupancy map and which is occupied in the reconstructed occupancy map is determined using the recoloring.

17. The non-transitory computer-readable medium of claim 16, wherein a plurality of color values of a plurality of pixels included in a block including the semi-occupied pixel are determined using the recoloring.

* * * * *